(12) United States Patent
Shoji

(10) Patent No.: US 6,732,130 B2
(45) Date of Patent: May 4, 2004

(54) FAST HADAMARD TRANSFORM DEVICE

(75) Inventor: Takashi Shoji, Tokyo (JP)

(73) Assignee: NEC Corporation, Tokyo (JP)

( * ) Notice: Subject to any disclaimer, the term of this patent is extended or adjusted under 35 U.S.C. 154(b) by 510 days.

(21) Appl. No.: 09/745,649

(22) Filed: Dec. 22, 2000

(65) Prior Publication Data

US 2001/0007110 A1 Jul. 5, 2001

(30) Foreign Application Priority Data

Dec. 24, 1999 (JP) .......................................... 11-365857

(51) Int. Cl.$^7$ .............................................. G06F 17/14
(52) U.S. Cl. ...................................... 708/400; 708/410
(58) Field of Search ................................ 708/400, 401, 708/402, 403, 410

(56) References Cited

U.S. PATENT DOCUMENTS

| 4,446,530 A | | 5/1984 | Tsuboka | |
| 5,561,618 A | * | 10/1996 | Dehesh | 708/400 |
| 5,726,925 A | * | 3/1998 | Hyun et al. | 708/410 |
| 5,784,293 A | * | 7/1998 | Lipa | 708/410 |
| 6,311,202 B1 | * | 10/2001 | Hahm | 708/410 |

FOREIGN PATENT DOCUMENTS

| JP | 5-233681 | 9/1993 |
| JP | 6-301711 | 10/1994 |

OTHER PUBLICATIONS

Bi et al., Electronics Letters, vol. 34, No. 21, pp. 2005–2006, 1998.

\* cited by examiner

*Primary Examiner*—Chuong Dinh Ngo
(74) *Attorney, Agent, or Firm*—Dickstein, Shapiro, Morin & Oshinsky, LLP.

(57) ABSTRACT

A fast Hadamard transform device is provided which prevent from increasing of circuit scale and shorten a developing TAT even if the number of bits to be operated. The device includes n of shift register units and n/2 of butterfly computation units. Input data are entered to the shift register units in response to a signal and data stored in the shift register units are supplied as quantized data by providing a signal for each "$\log_2 n * (p + \log_2 n)$" clocks.

5 Claims, 7 Drawing Sheets

| ADD$_0$ | ADD$_1$ | CIN | OUT | COUT |
|---|---|---|---|---|
| 0 | 0 | 0 | 0 | 0 |
| 0 | 0 | 1 | 1 | 0 |
| 0 | 1 | 0 | 1 | 0 |
| 0 | 1 | 1 | 0 | 1 |
| 1 | 0 | 0 | 1 | 0 |
| 1 | 0 | 1 | 0 | 1 |
| 1 | 1 | 0 | 0 | 1 |
| 1 | 1 | 1 | 1 | 1 |

| $ADD_0$ | $SUB_1$ | BIN | OUT | $\overline{BOUT}$ |
|---|---|---|---|---|
| 0 | 0 | 0 | 0 | 1 |
| 0 | 0 | 1 | 1 | 0 |
| 0 | 1 | 0 | 1 | 0 |
| 0 | 1 | 1 | 0 | 0 |
| 1 | 0 | 0 | 1 | 1 |
| 1 | 0 | 1 | 0 | 1 |
| 1 | 1 | 0 | 0 | 1 |
| 1 | 1 | 1 | 1 | 0 |

FIG.7

FAST HADAMARD TRANSFORM DEVICE

BACKGROUND OF THE INVENTION

1. Field of the Invention

The invention relates to a fast hadamard transform device and, in particular, to the transform device which is adapted to perform quadrature modulation of spread signals in a CDMA (Code Division Multiple Access) mobile communication system.

2. Description of the Related Art

In a mobile communication system which employs a communication method, CDMA, which is focused as the next generation standard mobile communication method, mobile communication terminals in the system can simultaneously communicate among a plurality of channels by using the same frequency band. Furthermore, a spread spectrum communication method is used in the CDMA mobile communication system.

The spread spectrum communication method can be realized, for example, by a Walsh quadrature modulation technique which uses a Walsh code such that a correlation function becomes zero at every channel. Herein, it is to be noted that the Walsh code can be expressed by a Hadamard transform matrix which is composed of elements of "+1" and "−1".

In the Walsh quadrature modulation, high speed or fast processing based on a butterfly computation can be achieved by carrying out Hadamard transform using the Hadamard transform matrix. A device which enables such high speed or fast Hadamard transform based on the butterfly computation may be called a fast Hadamard transform (FHT) device.

A conventional fast Hadamard transform device performs both addition and subtraction in the butterfly computation. Specifically, the addition is performed by using n/2 of $(p-1+\log_2 n)$ bits adders while the subtraction is performed by using n/2 of $(p-1+\log_2 n)$ bits subtractors. For brevity of description, it will be assumed that the number of quantization bits is represented by p and an n-th order Hadamard transform is carried out in the following. Especially, the description will be mainly made about an eighth-order fast Hadamard transform.

Now, a technology related to the conventional fast Hadamard transform device is disclosed in Japanese Laid Open Publication No. H06-301711 (namely, 301711/1994) "Fast Hadamard transform device".

However, in the conventional fast Hadamard transform device, if the number of bits used for calculation is increased to k times, the device has to be enlarged in size to 3k times. This is because three latches, that is, an input latch, a latch with selector, and an output latch should be prepared for each bit in the conventional fast Hadamard transform.

Further, since addition and subtraction are carried out in parallel with each other in the butterfly computation, not only each of adders and subtractors should process the number of bits equal to $(p-1+\log_2 n)$, but also each of latches should include a bit number of register stages which is equal to $(p-1+\log_2 n)$.

It is not desirable to fabricate such a fast Hadamard transform device as a gate array since a cost of the fabrication is increased due to an increase of scale of the device. Also, a great deal of times and labor are required to develop and prove each block and to repetitively arrange wiring in the same block for integration. This is because such blocks have different functions from one another and are structured by different circuit elements, such as a latch with selector, a latch with no selector, and the like.

SUMMARY OF THE INVENTION

It is, therefore, an object of the invention to provide a fast Hadamard transform device which can be configured in a small scale and developed in a short time, that is, within short developing TAT (Turn Around Time), even if the number of bits to be processed is increased.

According to a first aspect of the invention, there is provided a fast Hadamard transform device which transforms n elements of input data each of which is composed of p bits. The device comprises n of shift register units each of which inputs the corresponding element of the input data at the predetermined input timing and outputs the bits in the input data serially, and n/2 of butterfly computation units each of which receives a bit from each two of the n shift register units and performs addition and subtraction on the two bits to supply each operation result to a determined shift register unit.

According to a second aspect of the invention, there is provided a fast Hadamard transform device of the first aspect of the invention, and in the device, each of the shift register units operates as output latches holding $(p+\log_2 n)$ signals from one of the butterfly computation units at the predetermined output timing, and operates as $(p+\log_2 n)$ steps of shift registers in response to entering the input data and signals from one of the butterfly computation units at the other timing.

According to a third aspect of the invention, there is provided a fast Hadamard transform device of the second aspect of the invention, and in the device, each of the butterfly computation units includes an adder which performs addition on two bits which are shifted from the different shift register units and a carry bit which is stored in the former addition, a subtractor which performs subtraction on two bits which are shifted from the different shift register units and a borrow bit which is stored in the former subtraction.

According to a fourth aspect of the invention, there is provided a fast Hadamard transform device of the third aspect of the invention, and in the device, each of the carry bit and the borrow bit is stored in a delay circuit which is initialized every $(\log_2 n*(p+\log_2 n))$ shift timings.

According to a first aspect of the invention, there is provided a fast Hadamard transform device of the fourth aspect of the invention, and in the device, serial output of the shift register unit corresponding to the 2q−1-th ($1 \leq q \leq 4$, q is a natural number) order is connected to an input to the adder of the q-th butterfly computation unit, serial output of the shift register unit corresponding to the 2q-th order is connected to an input to the subtractor of the q-th butterfly computation unit, an output from the adder of the r-th ($1 \leq r \leq 4$, r is a natural number) butterfly computation unit is connected to the serial input of the r-th shift register unit, and an output from the subtractor of the r-th butterfly computation unit is connected to the serial input of the r+4-th shift register unit.

BRIEF DESCRIPTION OF THE DRAWINGS

FIG. 7 shows a diagram representing a combination of patterns of logic level of subtractors in the fast Hadamard transform device of the invention.

DESCRIPTION OF THE PREFERRED EMBODIMENT

Figure 1:
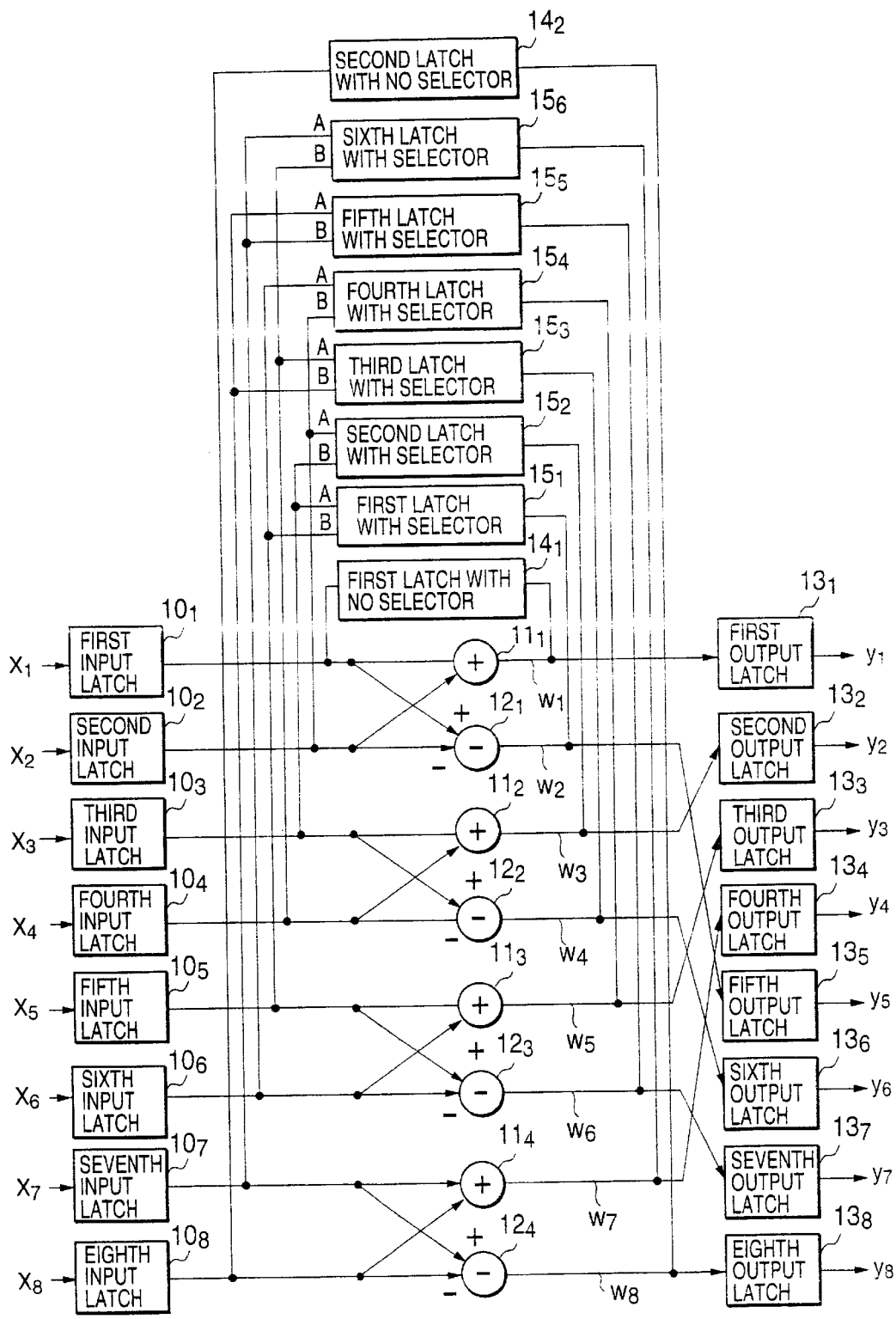
FIG. 1 shows a block diagram of a conventional fast Hadamard transform device.
Figure 2:
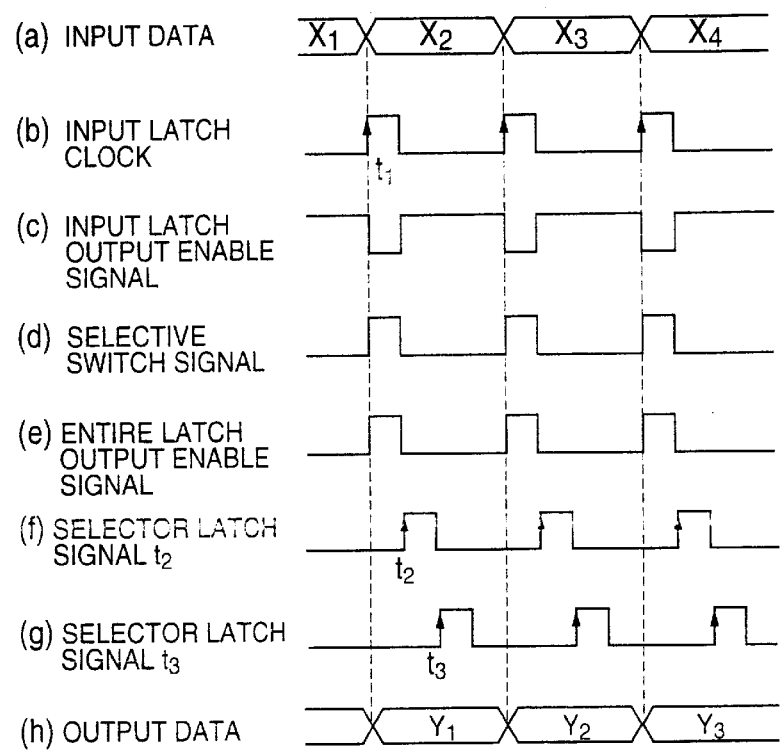
FIG. 2 shows a timing chart representing operation timings of the conventional fast Hadamard transform device.

At first, illustration is made about the above-described conventional fast Hadamard transform device with reference to FIGS. 1 and 2.

In FIG. 1, the conventional fast Hadamard transform device can carry out the n-th order of the Hadamard transform. Herein, it is assumed that the illustrated device carries out an eighth order of the Hadamard transform, that is, n is equal to eight and the number of quantization bits is equal to p. The device receives eight elements (or dimension) of input vector X in a bit serial manner and each of the elements $x_1-x_8$ of the vector X is successively latched by each of a first input latch $10_1$ through an eighth input latch $10_8$ in the illustrated manner.

Each of output terminals of the first input latch $10_1$ through the eighth input latch $10_8$ can be put into a high impedance state in response to an input latch output enable signal (not shown). Both the output terminals of the first input latch $10_1$ and the second latch $10_2$ are connected to an adder $11_1$ and a subtractor $12_1$. Herein, adders and subtractors concerned with the conventional fast Hadamard transform device can carry out addition and subtraction in response to the $(p-1+\log_2 n)$ of bits, and therefore each of the adders may be denoted as $(p-1+\log_2 n)$ adder and each of the subtractors may be denoted as $(p-1+\log_2 n)$ subtractor.

Similarly, both the output terminals of the third input latch $10_3$ and the fourth latch $10_4$ are connected to an adder $11_2$ and a subtractor $12_2$. Both the output terminals of the fifth input latch $10_5$ and the sixth latch $10_6$ are connected to an adder $11_3$ and a subtractor $12_3$. Both the output terminals of the seventh input latch $10_7$ and the eighth latch $10_8$ are connected to an adder $11_4$ and a subtractor $12_4$.

An output terminal of the adder $11_1$ is connected to a first output latch $13_1$ and a first latch $14_1$ with no selector. An output terminal of the subtractor $12_1$ is connected to a fifth output latch $13_5$ and a first latch $15_1$ with selector. An output terminal of the adder $11_2$ is connected to a second output latch $13_2$ and a second latch $15_2$ with selector. An output terminal of the subtractor $12_2$ is connected to a sixth output latch $13_6$ and a third latch $15_3$ with selector.

An output terminal of the adder $11_3$ is connected to a third output latch $13_3$ and a fourth latch $15_4$ with selector. An output terminal of the subtractor $12_3$ is connected to a seventh output latch $13_7$ and a fifth latch $15_5$ with selector. An output terminal of the adder $11_4$ is connected to a fourth output latch $13_4$ and a sixth latch $15_6$ with selector. An output terminal of the subtractor $12_4$ is connected to an eighth output latch $13_8$ and a second latch $14_2$ with no selector.

A butterfly computation unit is configured by a pair of an adder and a subtractor (such as the adder $11_1$ and the subtractor $12_1$), both of which are given the same inputs.

The first latch $14_1$ with no selector and the second latch $14_2$ with no selector latch an output of an adder or a subtractor in response to a selector latch signal (not shown). Also, an output terminal of the first latch $14_1$ with no selector and an output terminal of the second latch $14_2$ with no selector are connected to an output terminal of the first input latch $10_1$ and an output terminal of the eighth input latch $10_8$, respectively. Both of them are kept at high impedance states in response to entire latch output enable signals (not shown) which are delivered to all of the latches with and without selectors, as will become clear later.

The first latch with selector $15_1$ through the sixth latch with selector $15_6$ latch an output of an adder or a subtractor in response to a selector latch signal (not shown). Each of the first latch $15_1$ with selector through the sixth latch $15_6$ with selector has two output terminals A and B, and outputs latched data from one of the terminals according to a "latch with selector" switch signal (not shown). The "latch with selector" switch signal serves to selectively switch only the firth through the sixth latches with selector, with the first and the second latches $14_1$ and $14_2$ kept intact, and therefore will be referred to as a selective switch signal. Also, these terminals are connected to one of output terminals of the second input latch $10_2$ through the seventh input latch $10_7$ and are kept at high impedance states by the above-mentioned entire latch output enable signal.

The first output latch $13_1$ through the eighth output latch $13_8$ latch output of the corresponding adder or the corresponding subtractor in according to an output latch signal (not shown) and outputs elements $y_1-y_8$ of the output vector Y.

Next, operation of the device illustrated in FIG. 1 will be described with reference to FIG. 2. At timing t1, each of the first input latch $10_1$ through the eighth input latch $10_8$ latches each of the corresponding elements ((a) in FIG. 2) of the eight elements of the input vector X by an input latch clock ((b) in FIG. 2). At this point, the input-latch output enable signal is turned to a low level signal "L" ((c) in FIG. 2) and the entire latch output enable signal is turned to a high level signal "H" ((e) in FIG. 2) and is sent to all of the latches $14_1$, $14_2$, $15_1$ to $15_6$ to put them into the high impedance states. Under the circumstances, latch signals which are latched in all the input latches are supplied to the adders $11_1-11_4$ or the subtractors $12_1-12_4$, with all of the latches $14_1$, $14_2$, $15_1$ to $15_8$ kept in the high impedance states. In this event, output terminals A of the first through the sixth latches $15_1-15_6$ with selectors are selected by the selective switch signal ((d) in FIG. 2). At this time instant $t_1$, the adders and subtractors generate and feed, back to the latches, output signals $w_1$ to $w_8$ given by:

$$w_1(t_1)=x_1+x_2$$

$$w_2(t_1)=x_1-x_2$$

$$w_3(t_1)=x_3+x_4$$

$$w_4(t_1)=x_3-x_4$$

$$w_5(t_1)=x_5+x_6$$

$$w_6(t_1)=x_5-x_6$$

$$w_7(t_1)=x_7+x_8$$

$$w_8(t_1)=x_7-x_8$$

Next, at timing $t_2$, the feedback signal $w_1(t_1)$ is stored to the first latch $14_1$ with no selector and $w_8(t_1)$ is stored to the second latch $14_2$ with no selector in response to a selector latch signal ((f) in FIG. 2). Further, the remaining feedback signals $w_2(t_1)$, $w_3(t_1)$, $w_4(t_1)$, $w_5(t_1)$, $w_6(t_1)$, and $w_7(t_1)$ are stored to the first latch $15_1$ with selector, the second latch $15_2$ with selector, the third latch $15_3$ with selector, the fourth latch $15_4$ with selector, the fifth latch $15_5$ with selector, and the sixth latch $15_6$ with selector, respectively ((f) in FIG. 2). At this time point t2, the input-latch output enable signal is turned back to the high level signal "H" ((c) in FIG. 2) while the entire latch output enable signal is turned to the low level signal "L" ((e) in FIG. 2). Under the circumstances, latch signals which are latched by the latches $14_1$, $14_2$, and $15_1$–$15_6$ are supplied to the adders $11_1$–$11_4$ or the subtractors $12_1$–$12_4$. As a result, the adders and subtractors produce, at the time point t2, output signals represented by:

$$w_1(t_2)=w_1(t_1)+w_3(t_1)=x_1+x_2+x_3+x_4$$

$$w_2(t_2)=w_1(t_1)-w_3(t_1)=x_1+x_2-x_3-x_4$$

$$w_3(t_2)=w_2(t_1)+w_4(t_1)=x_1-x_2+x_3-x_4$$

$$w_4(t_2)=w_2(t_1)-w_4(t_1)=x_1-x_2-x_3+x_4$$

$$w_5(t_2)=w_5(t_1)+w_7(t_1)=x_5+x_6+x_7+x_8$$

$$w_6(t_2)=w_5(t_1)-w_7(t_1)=x_5+x_6-x_7-x_8$$

$$w_7(t_2)=w_6(t_1)+w_8(t_1)=x_5-x_6+x_7-x_8$$

$$w_8(t_2)=w_6(t_1)-w_8(t_1)=x_5-x_6-x_7+x_8$$

Next, at timing $t_3$, the feedback signal $w_1(t_2)$ is stored to the first latch $14_1$ with no selector and $w_8(t_2)$ is stored to the second latch $14_2$ with no selector in response to the selector latch signal ((g) in FIG. 2). Further, the feedback signals $w_2(t_2)$, $w_3(t_2)$, $w_4(t_2)$, $w_5(t_2)$, $w_6(t_2)$, and $w_7(t_2)$ are stored to the first latch $15_1$ with selector, the second latch $15_2$ with selector, the third latch $15_3$ with selector, the fourth latch $15_4$ with selector, the fifth latch $15_5$ with selector, and the sixth latch $15_6$ with selector, respectively ((g) in FIG. 2). After the timing $t_2$, output terminals B of the latches $15_1$–$15_6$ are selected by the selective switch signal ((d) in FIG. 2), and each of feedback signals of the adders and subtractors is given by:

$$w_1(t_3)=w_1(t_2)+w_5(t_2)=x_1+x_2+x_3+x_4+x_5+x_6+x_7+x_8$$

$$w_2(t_3)=w_1(t_2)-w_5(t_2)=x_1+x_2+x_3+x_4-x_5-x_6-x_7-x_8$$

$$w_3(t_3)=w_3(t_2)+w_7(t_2)=x_1-x_2+x_3-x_4+x_5-x_6+x_7-x_8$$

$$w_4(t_3)=w_3(t_2)-w_7(t_2)=x_1-x_2+x_3-x_4-x_5+x_6-x_7+x_8$$

$$w_5(t_3)=w_2(t_2)+w_6(t_2)=x_1+x_2-x_3-x_4+x_5+x_6-x_7-x_8$$

$$w_6(t_3)=w_2(t_2)-w_6(t_2)=x_1+x_2-x_3-x_4-x_5-x_6+x_7+x_8$$

$$w_7(t_3)=w_4(t_2)+w_8(t_2)=x_1-x_2-x_3+x_4+x_5-x_6-x_7+x_8$$

$$w_8(t_3)=w_4(t_2)-w_8(t_2)=x_1-x_2-x_3+x_4-x_5+x_6+x_7-x_8$$

After that, by the output latch clock which is coincident with an input latch clock at the next timing $t_1$, the feedback signals $w_1(t_3)$–$w_8(t_3)$ are latched by the corresponding output latches $13_1$–$13_8$, and elements $y_1$–$y_8$ of output data Y are given by:

$$y1=w_1(t_3)=x_1+x_2+x_3+x_4+x_5+x_6+x_7+x_8$$

$$y2=w_3(t_3)=x_1-x_2+x_3-x_4+x_5-x_6+x_7-x_8$$

$$y3=w_5(t_3)=x_1+x_2-x_3+x_4+x_5+x_6-x_7+x_8$$

$$y4=w_7(t_3)=x_1-x_2-x_3+x_4+x_5-x_6-x_7+x_8$$

$$y5=w_2(t_3)=x_1+x_2+x_3+x_4-x_5-x_6-x_7-x_8$$

$$y6=w_4(t_3)=x_1-x_2+x_3-x_4-x_5+x_6-x_7+x_8$$

$$y7=w_6(t_3)=x_1+x_2-x_3-x_4-x_5-x_6+x_7+x_8$$

$$y8=w_8(t_3)=x_1-x_2-x_3+x_4-x_5+x_6+x_7-x_8$$

The illustrated conventional fast Hadamard transform device has shortcomings as mentioned in the preamble of the instant specification.

Next, description is made about a fast Hadamard transform device according to an embodiment of the invention.

Figure 3:
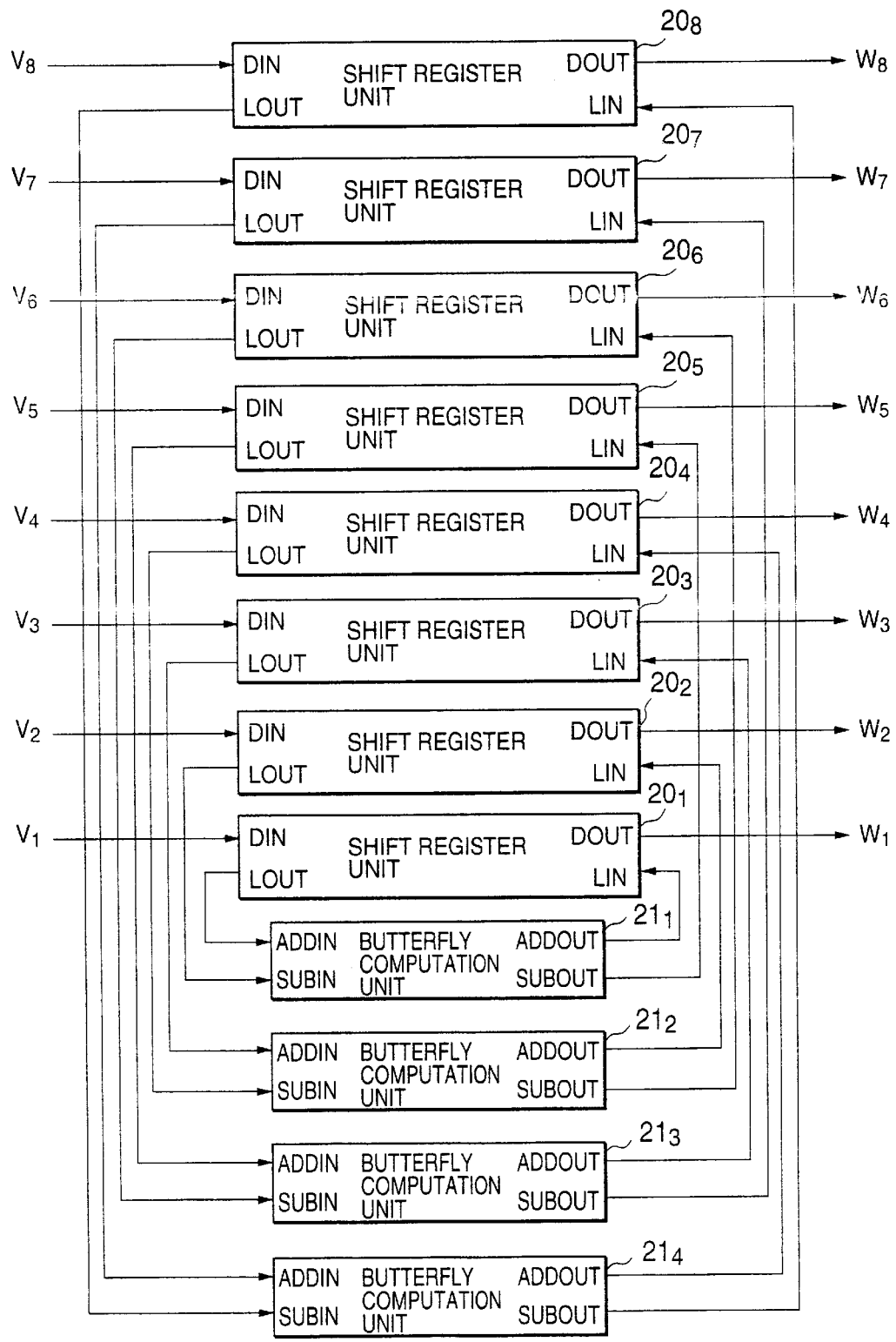
FIG. 3 shows a block diagram of a fast Hadamard transform device according to an embodiment of the invention.

In FIG. 3, the fast Hadamard transform device of the invention includes shift register units $20_1$–$20_n$, n in number, and butterfly computation units $21_1$–$21_{n/2}$, n/2 in number, to perform n-th order fast Hadamard transform of p of quantization bits.

Each of shift register units $20_1$–$20_n$ includes two input terminals DIN and LIN, and two output terminals DOUT and LOUT. To the DIN, n elements of input data $V_1$–$V_n$ are supplied, and from the DOUT, n elements of output data $W_1$–$W_n$ are supplied. The input data V1–Vn which are supplied to the DIN are then supplied to the butterfly computation unit as serial data bit by bit. The bit computed by the butterfly computation unit is supplied to the LIN.

Each of the shift register units $20_1$–$20_n$ shares an input latch and an output latch by preparing a selector and inputs the input data $V_1$–$V_n$ from DIN at a predetermined input timing. The input data are then transformed to serial data at the shift register unit and addition or subtraction is performed on the serial data by the butterfly computation unit bit by bit. Consequently, the result from the operation is supplied from the DOUT at predetermined output timing as output data $W_1$–$W_n$.

The butterfly computation unit includes two input terminals ADDIN and SUBIN, and two output terminals ADDOUT and SUBOUT. The unit performs butterfly computation on the input data from the LOUT of the shift register unit and supplies the result to the LIN of the shift register unit.

Next, description is made about main parts of the fast Hadamard transform device of the invention. Herein, it is assumed that the number of quantized bits is four and order is eight. In this connection, the illustrated fast Hadamard transform device includes shift register units $20_1$–$20_8$ and butterfly computation units $21_1$–$21_4$.

Herein, it is to be noted that all the shift register units $20_1$–$20_8$ have the same configuration. Each of Input signals $V_1$–$V_8$ is supplied to the corresponding DIN of the shift register units $20_1$–$20_8$ and each of output signals $W_1$–$W_8$ is supplied from the corresponding DOUT of the shift register units $20_1$–$20_8$.

The LOUT of the shift register unit $20_{2q-1}$ ($1 \leq q \leq 4$, q is a natural number) is connected to the ADDIN of the butterfly computation unit $21_q$. Also, the LOUT of the shift register unit $20_{2q}$ is connected to the SUBIN of the butterfly computation unit $21_q$.

The ADDOUT of the butterfly computation unit $21_r$ ($1 \leq r \leq 4$, r is a natural number) is connected to the LIN of the shift register unit $20_r$. Also, SUBOUT of the butterfly computation unit $21_r$ is connected to the LIN of the shift register unit $20_{r+4}$.

Figure 4:
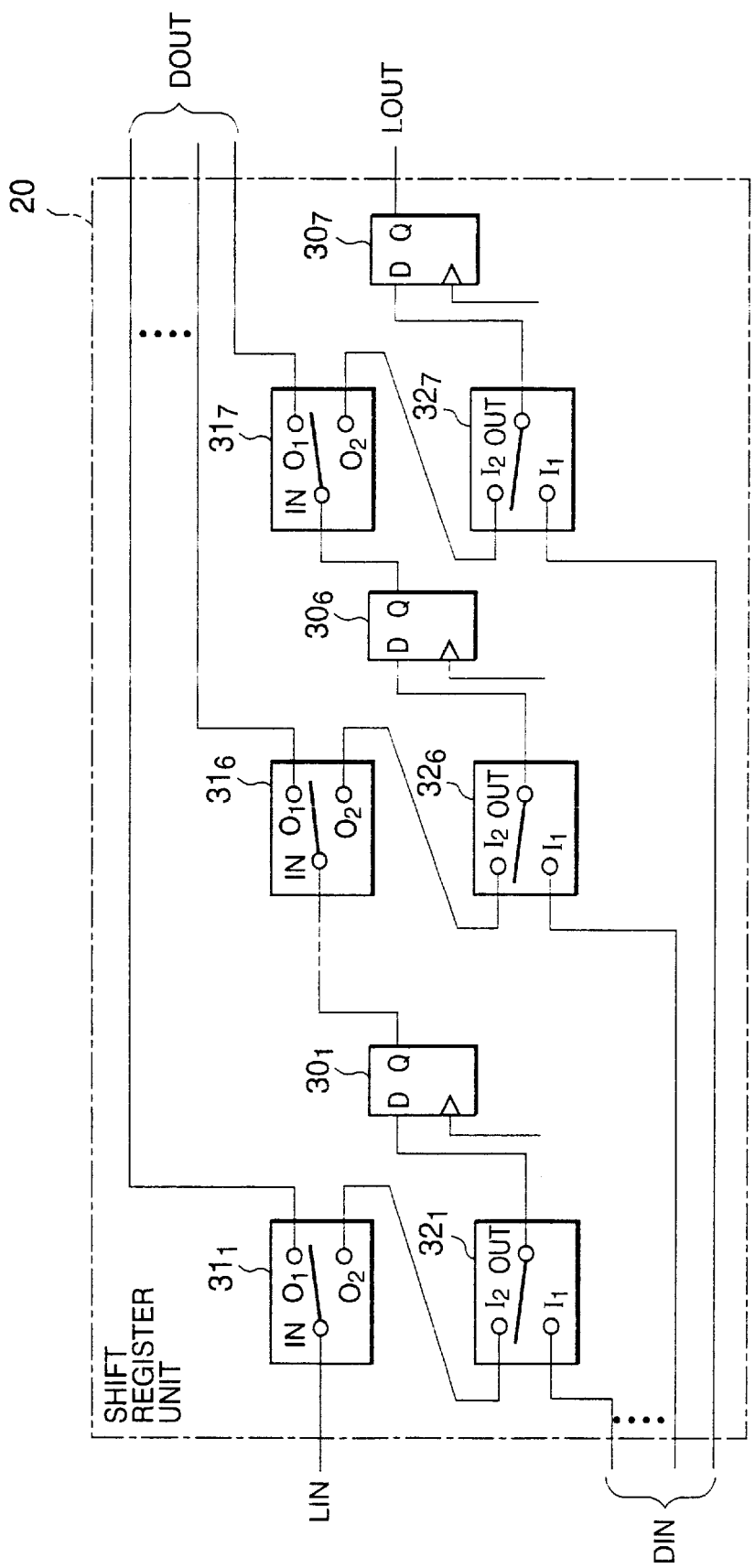
FIG. 4 shows a diagram representing a main part of a shift register unit of the fast Hadamard transform device of the invention.

The shift register unit 20 shown in FIG. 4 includes m of 1 bit flip flop circuits $30_1$–$30_m$, m of input switches $31_1$–$31_m$, and m of output switches $32_1$–$32_m$. Herein, it is assumed that m is "p+$\log_2$n".

Each of the flip flop circuits $30_1$–$30_m$ latches an input signal of a D terminal at a predetermined latch clock and outputs the signal from a Q terminal. Each of the input switches $31_1$–$31_m$ outputs an input signal entered from an IN terminal to an $O_1$ terminal or an $O_2$ terminal in according to a predetermined input switch signal. Each of the output switches $32_1$–$32_m$ inputs an input signal from an $I_1$ terminal or an $I_2$ terminal in according to a predetermined output switch signal and outputs the signal from an OUT terminal.

A signal from LIN is supplied to an IN terminal of the input switch $31_1$. From an $O_1$ terminal of the input switch $31_1$, a bit of DOUT is supplied. An $O_2$ terminal of the input switch $31_1$ is connected to an $I_2$ terminal of the output switch $32_1$. A most significant bit (MSB) of DIN is supplied to an $I_1$ terminal of the output switch $32_1$. An OUT terminal of the output switch $32_1$ is connected to a D terminal of the flip flop circuit $30_1$.

To each of IN terminals of the input switches $31_2$–$31_7$, the corresponding Q terminal of the flip flop circuits $30_1$–$30_6$, which reside the former step of the input switches, is connected. Signal from each of $O_1$ terminals of the input switches $31_2$–$31_7$ are supplied as a bit of the DOUT. Each of $O_2$ terminals of the input switches $31_2$–$31_7$ is connected to the corresponding $I_2$ terminal of the output switches $32_2$–$32_7$. Each of bits from the next to the MSB to the least significant bit (LSB) of the DIN is entered to one of $I_1$ terminals of the output switches $32_2$–$32_7$ in order. OUT terminals of the output switches $32_2$–$32_7$ are connected to the corresponding D terminal of the flip flop circuits $30_2$–$30_7$. A Q terminal of the flip flop circuit $30_7$ is supplied as LOUT.

Such configuration of flip flop circuit keeps transform result bit by bit at each step of n-th order fast Hadamard transform. The input switch and the output switch controls flow of signals when the signals are supplied to the fast Hadamard transform device of the embodiment or when the signals are supplied as operation results. That is, each of the output switches $32_1$–$32_7$ connects the $I_1$ terminal to the OUT terminal by the input switch signal at the predetermined signal input timing, and supplies an input signal from the DIN to one of the flip flop circuits $30_1$–$30_7$. Also, each of the input switches $31_1$–$31_7$ connects the IN terminal to the $O_1$ terminal by the output switch signal at the predetermined signal output timing, and supplies a result from the butterfly computation entered from the LIN as DOUT. In the other timing, each of the input switches 311–317 connects the IN terminal to the O2 terminal, each of the output switches $32_1$–$32_7$ connects the $I_2$ terminal to the OUT terminal, signals are shifted at the flip flop circuits 301–307 by a bit for each predetermined latch clock and consecutively supplied to the butterfly computation unit as LOUT.

Figures 5, 6:
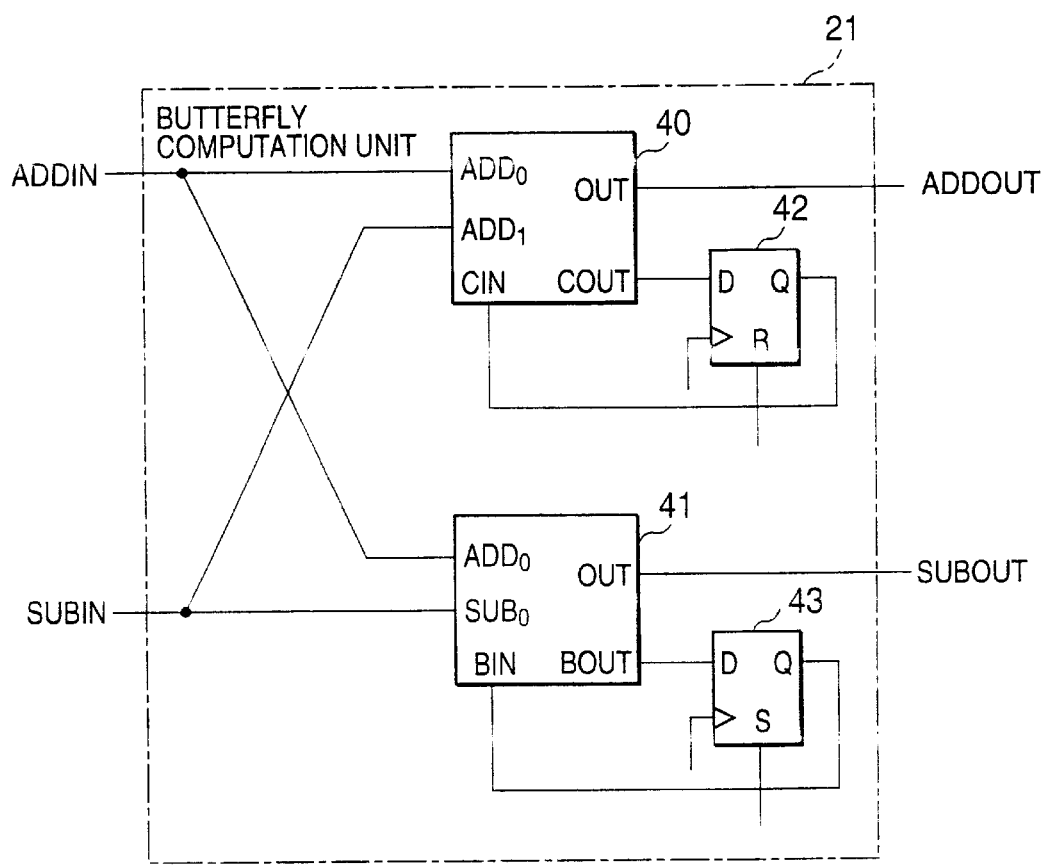
FIG. 5 shows a diagram representing a main part of a butterfly computation unit of the fast Hadamard transform device of the invention.
FIG. 6 shows a diagram representing a combination of patterns of logic level of adders in the fast Hadamard transform device of the invention.

The butterfly computation unit 21 shown in FIG. 5 includes an adder 40 having a bit of carry input/output, a subtractor 41 having a bit of borrow input/output, a flip flop circuit 42 having a bit of reset, and a flip flop circuit 43 having a bit of set.

A signal which is supplied from the shift register unit to an ADDIN is supplied to an $ADD_0$ terminal of the adder 40 and to an $ADD_0$ terminal of the subtractor 41. Also, a signal which is supplied from the shift register unit to a SUBIN is supplied to an $ADD_1$ terminal of the adder 40 and to an $SUB_0$ terminal of the subtractor 41.

As shown in FIG. 5, the adder 40 outputs to the OUT terminal a result from adding of a bit from the ADD0 terminal, a bit from the ADD1 terminal, and a carry bit from the CIN terminal, and outputs an output carry bit to the COUT terminal. The result of adding from the OUT terminal is supplied to the shift register unit as ADDOUT. The COUT terminal is connected to a D terminal of the flip flop circuit $4_2$, and a Q terminal of the circuit 42 is connected to the CIN terminal of the adder 40.

As shown in FIG. 7, the subtractor 41 subtracts using a bit from the ADD0 terminal, a bit from the SUB0 terminal, and a borrow bit from the BIN terminal and outputs the subtracting result to the OUT terminal. Further, the subtractor 41 outputs a borrow bit to the BOUT terminal. The subtracting result from the OUT terminal is supplied to the shift register unit as SUBOUT. The BOUT terminal is connected to a D terminal of the flip flop circuit 43, and a Q terminal of the flip flop circuit 43 is connected to the BIN terminal of the subtractor 41.

The flip flop circuit 42 outputs "0" in response to a reset signal entered into an R terminal at an initial status, and performs, at a normal status, carry computation of a bit by delaying a carry bit by a clock of a latch clock and supplying the carry bit to the adder 40.

The flip flop circuit 43 outputs "1" in response to a set signal entered into an S terminal at an initial status, and performs, at a normal status, borrow computation of a bit by delaying a borrow bit by a clock of a latch clock and supplying the borrow bit to the subtractor 41.

Figure 8:
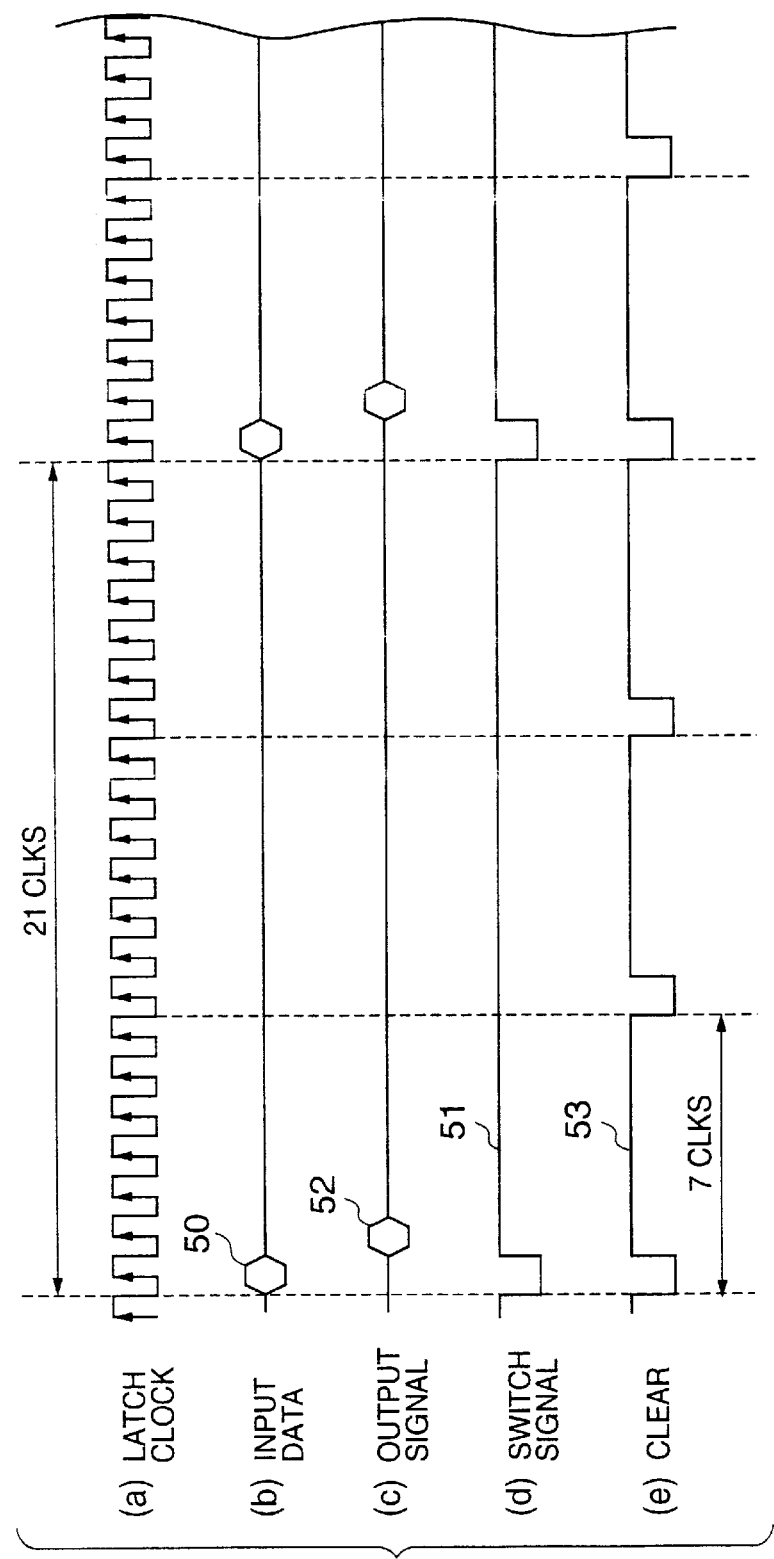
FIG. 8 shows a diagram representing transition of operation timing of the fast Hadamard transform device of the invention.

Next, description is made about operations of the above fast Hadamard transform device with reference to FIG. 8.

In FIG. 8, five lines (a) to (e) are shown. The top line (a) shows a timing of latch clock and the second line (b) shows an input timing of an input vector. The third line (c) shows an output timing of signals from the fast Hadamard transform device, and the forth line (d) shows a switching timing between an input switch and an output switch. The last line (e) shows a reset timing of the adder of the butterfly computation unit and a set timing of the subtractor of the butterfly computation unit.

When eighth order fast Hadamard transform is performed on data series in which the number of quantized bits p is four, input signals 50 including eight elements of input vectors $V_0$–$V_7$ are entered to the DIN of the corresponding shift register unit of the fast Hadamard transform device of the invention at a timing shown in the line (b) in FIG. 8.

Each of the input vectors $V_0$–$V_7$ include bits $b_3$, $b_2$, $b_1$, and $b_0$ from the MSB side. The input signals 50 are then entered from LOUT of the corresponding shift register unit to the corresponding butterfly computation unit from the LSB side.

Specifically, $b_3$ of the DIN is entered into an $I_1$ terminal of the input switch $32_4$, $b_2$ of the DIN is entered into an $I_1$ terminal of the input switch $32_5$, $b_1$ of the DIN is entered into an $I_1$ terminal of the input switch $32_6$, and $b_0$ of the DIN is entered into an $I_1$ terminal of the input switch $32_7$.

Seven input switches are prepared for seven bits, this is because that carry occurs by the butterfly computation unit, thus, when the signals are entered, zero is given to each high order three bits including MSB. Therefore, when the signals are entered, zero is set to the $I_1$ terminals of the input switches $32_1$–$32_3$.

In response to entering of the signals, at a timing as shown in FIG. 8, line (d), the input switch signal 51 is entered into the input switches $32_1$–$32_7$. When the input switch signal 51 is low level "L", in each of the input switches $32_1$–$32_7$, the $I_1$ terminal and the OUT terminal are connected, and an input signal supplied to the $I_1$ terminal is entered to the D terminal of the corresponding one of the flip flop circuits $30_1$–$30_7$. Also, the output switch signal is supposed to be entered to the output switches $31_1$–$31_7$ at the same timing as the input switch signal 51, when the output signal is low level "L", in each of the output switches $31_1$–$31_7$, the IN terminal and the $O_1$ terminal are connected, and an input signal supplied to the IN terminal is entered to the DOUT terminal.

The signals of the DOUT terminal are supplied as output signals 52 of results from the fast Hadamard transform of the last cycle. Also, as shown in FIG. 8, line (e), the flip flop circuits 42 and 43 of the butterfly computation unit are initialized since the reset signal and the set signal are entered into the butterfly computation unit (clear 53).

As described above, when the input switch signal is high level "H", each of the shift register units $20_1$–$20_8$ is composed of seven steps of shift register. While the input switch signal is "H", since the output switch signal is also high level "H", a bit of signal is supplied from the ADDOUT or the SUBOUT of the butterfly computation unit to the LIN, a result from the shift register unit is supplied from the LOUT to the ADDIN or the SUBIN of the butterfly computation unit bit by bit. And when shift is performed seven times, that is, an input signal is passed a round of the shift register unit, the first step of computation of the fast Hadamard transform which performs three (=$\log_2 n$) steps is completed.

That is, for signals which are stored in the flip flop circuits $30_1$–$30_7$ of the shift register unit at a predetermined input timing, addition is performed about an LSB at the first clock. For example, as a result of the adding, result "$V_1+V_2$" is supplied from the ADDOUT of the butterfly computation unit $21_1$. On the other hand, result "$V_1-V_2$" is supplied from the SUBOUT of the butterfly computation unit $21_1$.

Herein, for $V_1$ and $V_2$ (each of which can be represented as $b_3$–$b_1$, ($b_7$, $b_6$, and $b_5$ are zero)), "$V_1+V_2$" supplied from the ADDOUT is shown as follows.

At first clock: $V_1(b_0)+V_2(b_0)$

At second clock: $V_1(b_1)+V_2(b_1)$+(carry in adding $b_0$)

At third clock: $V_1(b_2)+V_2(b_2)$+(carry in adding $b_1$)

At fourth clock: $V_1(b_1)+V_2(b_3)$+(carry in adding $b_2$)

At fifth clock: $V_1(b_4)+V_2(b_4)$+(carry in adding $b_3$)

At sixth clock: $V_1(b_5)+V_2(b_5)$+(carry in adding $b_4$)

At seventh clock: $V_1(b_6)+V_2(b_6)$+(carry in adding $b_5$)

It is assumed that operation results stored in the flip flop circuits $30_1$–$30_7$ of the shift register unit at the seventh clock from the entering of the input signal are quantized data in which the bit stored in the flip flop $30_1$ corresponds to the MSB and the bit stored in the flip flop $30_7$ corresponds to the LSB, these feedback data $w_1(1)$-$w_8(1)$ are shown as follows.

$$W_1(1)=V_1+V_2$$

$$W_2(1)=V_1-V_2$$

$$W_3(1)=V_3+V_4$$

$$W_4(1)=V_3-V_4$$

$$W_5(1)=V_5+V_6$$

$$W_6(1)=V_5-V_6$$

$$W_7(1)=V_7+V_8$$

$$W_8(1)=V_7-V_8$$

Then, after the seventh clock from the entering of the input signal, as shown in FIG. 8, line (e), the reset signal and the set signal are entered into the butterfly computation unit, the adder and the subtractor of the butterfly computation unit are initialized. After that, the similar operation on the signal in the shift register unit is repeated bit by bit. As a result, in the next seven clocks (after the fourteenth clock from the entering of the input signal), the feedback data $w_1(2)$-$w_8(2)$ are changed as follows.

$$W_1(2)=V_1+V_2+V_3+V_4$$

$$W_2(2)=V_5+V_6+V_7+V_8$$

$$W_3(2)=V_1-V_2+V_3-V_4$$

$$W_4(2)=V_5-V_6+V_7-V_8$$

$$W_5(2)=V_1+V_2-V_3-V_4$$

$$W_6(2)=V_5+V_6-V_7-V_8$$

$$W_7(2)=V_1-V_2-V_3+V_4$$

$$W_8(2)=V_5-V_6-V_7+V_8$$

Similarly, for each seven clocks, the reset signal and the set signal are entered into the butterfly computation unit and the unit is initialized. Therefore, when still the next seven clocks are passed, the feedback data $w_1(3)$-$w_8(3)$ are changed as follows.

$$W_1(3)=V_1+V_2+V_3+V_4+V_5+V_6+V_7+V_8$$

$$W_2(3)=V_1-V_2+V_3-V_4+V_5-V_6+V_7-V_8$$

$$W_3(3)=V_1+V_2-V_3-V_4+V_5+V_6-V_7-V_8$$

$$W_4(3)=V_1-V_2-V_3+V_4+V_5-V_6-V_7+V_8$$

$$W_5(3)=V_1+V_2+V_3+V_4-V_5-V_6-V_7-V_8$$

$$W_6(3)=V_1-V_2+V_3-V_4-V_5+V_6-V_7+V_8$$

$$W_7(3)=V_1+V_2-V_3-V_4-V_5-V_6+V_7+V_8$$

$$W_8(3)=V_1-V_2-V_3+V_4-V_5+V_6+V_7-V_8$$

As mentioned above, parallel-serial transform is performed by the flip flop of the shift register, and addition/subtraction is performed in "$\log_2 n*(p+\log_2 n)$)" clocks. For example, if the number of quantized bits is four, and input vector has eight elements, eighth order Hadamard transform of the input vector can be completed in twenty one clocks. As shown in FIG. 8, line (d), for each twenty one clocks, switching between the input switches and the output switches is performed in response to the switch signal, quantized data stored in the flip flop circuit of the shift register are supplied as DOUT and next input vector is entered.

Therefore, the fast Hadamard transform device of the invention includes n of shift register units each of which is the same configuration for each n elements of input data having quantized bit number p, and is composed of "$p+\log_2 n$" steps of one bit shift registers with switches capable of sharing the input latches and the output latches, and $n/2$ butterfly computation units each of which performs addition/subtraction bit by bit.

Thereby, the number of latches is reduced to ⅓, scale of circuits can be reduced to 1/"3*the number of quantized bits", although the conventional device requires a plurality of sets each of which includes a plurality of adders and subtractors, and a plurality of bits of latch register.

Therefore, even if the number of bits to be operated is increased, increase of scale of circuits can be suppressed to the minimum. Also, it is possible to reduce the developing man-hour and developing TAT and to provide a suitable configuration of fast Hadamard transform device since each block which configures a part of the fast Hadamard transform device has the same configuration.

Further, in the fast Hadamard transform device of the invention, higher speed operation can be performed since a circuit configuration of the device is sophisticatedly simplified and operation can be performed bit by bit. Thereby, the device can be operated at higher latch clock.

What is claimed is:

1. A fast Hadamard transform device which transforms n elements of input data each of which is composed of p bits, comprising:

n of shift register units each of which inputs a corresponding element of the input data at a predetermined input timing and outputs the bits in the input data serially; and n/2 of butterfly computation units each of which receives a bit from each two of the n shift register units and performs addition and subtraction on the two bits to supply each operation result to a determined shift register unit.

2. The fast Hadamard transform device of claim 1, wherein each of the shift register units operates as output latches holding $(p+\log_2 n)$ signals from one of the butterfly computation units at a predetermined output timing, and operates as $(p+\log_2 n)$ steps of shift registers in response to entering the input data and signals from one of the butterfly computation units at an other timing.

3. The fast Hadamard transform device of claim 2, wherein each of the butterfly computation units includes:

an adder which performs addition on two bits which are shifted from different shift register units and a carry bit which is stored in the former addition; and a subtractor which performs subtraction on two bits which are shifted from the different shift register units and a borrow bit which is stored in the former subtraction.

4. The fast Hadamard transform device of claim 3, wherein each of the carry bit and the borrow bit is stored in a delay circuit which is initialized every $(\log_2 n * (p+\log_2 n))$ shift timings.

5. The fast Hadamard transform device of claim 3, wherein serial output of the shift register unit corresponding to the 2q−1-th ($1 \leq q \leq 4$, q is a natural number) order is connected to an input to the adder of the q-th butterfly computation unit, serial output of the shift register unit corresponding to the 2q-th order is connected to an input to the subtractor of the q-th butterfly computation unit, an output from the adder of the r-th ($1 \leq r \leq 4$, r is a natural number) butterfly computation unit is connected to the serial input of the r-th shift register unit, and an output from the subtractor of the r-th butterfly computation unit is connected to the serial input of the r+4-th shift register unit.

* * * * *